US010334235B2

(12) United States Patent
Liu et al.

(10) Patent No.: US 10,334,235 B2
(45) Date of Patent: Jun. 25, 2019

(54) BINOCULAR SEE-THROUGH AR HEAD-MOUNTED DISPLAY DEVICE AND INFORMATION DISPLAY METHOD THEREFOR

(71) Applicant: CHENGDU IDEALSEE TECHNOLOGY CO., LTD., Chengdu, Sichuan (CN)

(72) Inventors: Yinqiu Liu, Sichuan (CN); Qinhua Huang, Sichuan (CN); Yang Liu, Sichuan (CN); Xinyu Li, Sichuan (CN); Haitao Song, Sichuan (CN)

(73) Assignee: CHENGDU IDEALSEE TECHNOLOGY CO., LTD., Chengdu, Sichuan (CN)

( * ) Notice: Subject to any disclaimer, the term of this patent is extended or adjusted under 35 U.S.C. 154(b) by 145 days.

(21) Appl. No.: 15/545,328

(22) PCT Filed: Aug. 7, 2015

(86) PCT No.: PCT/CN2015/086351
§ 371 (c)(1),
(2) Date: Jul. 21, 2017

(87) PCT Pub. No.: WO2016/115873
PCT Pub. Date: Jul. 28, 2016

(65) Prior Publication Data
US 2018/0007350 A1 Jan. 4, 2018

(30) Foreign Application Priority Data
Jan. 21, 2015 (CN) .......................... 2015 1 0029392

(51) Int. Cl.
G09G 5/00 (2006.01)
H04N 13/327 (2018.01)
(Continued)

(52) U.S. Cl.
CPC ........... *H04N 13/327* (2018.05); *G06T 7/593* (2017.01); *H04N 13/128* (2018.05);
(Continued)

(58) Field of Classification Search
CPC . G06F 3/012; G06F 3/01; G06F 3/011; G06F 3/013
See application file for complete search history.

(56) References Cited

U.S. PATENT DOCUMENTS 7,246,904 B2 * 7/2007 Knaan .................... A61B 3/113
351/206
7,306,337 B2 * 12/2007 Ji ............................ G06F 3/013
351/209
7,809,160 B2 * 10/2010 Vertegaal ............... A61B 3/113
345/157

FOREIGN PATENT DOCUMENTS

CN          1391126         1/2003
CN        103292710         9/2013
(Continued)

*Primary Examiner* — Vijay Shankar

(57) ABSTRACT

A binocular see-through AR head-mounted display device is disclosed. Based on that the mapping relationships $f_{c \to s}$ and $f_{d \to l}$ are pre-stored in the head-mounted device, the position of the target object in the camera image is obtained through an image tracking method, and is mapped to the screen coordinate system of the head-mounted device for calculating the left/right image display position. Through a monocular distance finding method, the distance between the target object and the camera is real-time calculated referring to the imaging scale of the camera, so as to calculate a left-right image distance, thereby calculating the right or the right image display position. Correspondingly, the present invention also provides an information display method for a binocular see-through AR head-mounted display device and an augmented reality information display system. The present invention is highly reliable with low cost.

20 Claims, 3 Drawing Sheets

(51) Int. Cl.
  *H04N 13/128* (2018.01)
  *H04N 13/344* (2018.01)
  *H04N 13/398* (2018.01)
  *G06T 7/593* (2017.01)
  *H04N 13/156* (2018.01)
  *H04N 13/366* (2018.01)

(52) U.S. Cl.
  CPC ......... *H04N 13/156* (2018.05); *H04N 13/344* (2018.05); *H04N 13/366* (2018.05); *H04N 13/398* (2018.05)

(56) References Cited

FOREIGN PATENT DOCUMENTS

| | | |
|---|---|---|
| CN | 103500446 | 1/2014 |
| WO | 2013046426 | 4/2013 |

* cited by examiner

BINOCULAR SEE-THROUGH AR HEAD-MOUNTED DISPLAY DEVICE AND INFORMATION DISPLAY METHOD THEREFOR

CROSS REFERENCE OF RELATED APPLICATION

This is a U.S. National Stage under 35 U.S.C 371 of the International Application PCT/CN2015/086351, filed Aug. 7, 2015, which claims priority under 35 U.S.C. 119(a-d) to CN 201510029392.9, filed Jan. 21, 2015.

BACKGROUND OF THE PRESENT INVENTION

Field of Invention

The present invention relates to a technical field of head-mounted display, and more particularly to a binocular see-through AR head-mounted display device and an information display method therefor.

Description of Related Arts

With the rise of wearable devices, a variety of head-mounted display devices have become research and development hot spots of major industrial giants, and gradually went into the public's horizon. The head-mounted display device is the best application platform for Augmented Reality Technique (AR), which renders the virtual information in a real-world environment through the headset window. However, at present, for most of the conventional AR head-mounted display devices, AR information stacks only consider the correlation with the X and Y axis coordinates of target positions, and do not calculate the depth information of the target. Therefore, the virtual information floats in front of the human eye, and is not highly integrated with the environment, leading to poor user experience. In addition, when the user sight is switched between the target object and the overlapping AR information, since the depths of the two in the user visual range are different, it is necessary to frequently adjust the focal length of the eye to see the contents, which increases burden of user eyes, and even causes discomfort in long-term use.

In the prior art, there are also methods of adjusting the depth of the virtual image on the display, wherein most of them mechanically adjust the optical structure of the optical lens group, thus changing the optical element image distance, so as to realize depth adjustment of the virtual image. However, the methods lead the head-mounted device to be bulky, costly and difficult to control accuracy.

SUMMARY OF THE PRESENT INVENTION

An object of the present invention is to provide an augmented reality information display system, a binocular see-through AR (augmented reality) head-mounted display device and an information display method therefor, which automatically adjusts depth of virtual information, in such a manner that the virtual information is completely fused with an environment.

Firstly, the present invention provides an information display method for a binocular see-through AR head-mounted display device, wherein a camera-screen mapping relationship $f_{c \to s}$, and a mapping relationship $f_{d \to i}$ between a left-right image equivalent-center spacing $d^t$ and a virtual image-eye distance $L_n$ are pre-stored in the binocular see-through AR head-mounted display device; wherein the information display method comprises steps of:

uploading a camera image to a server for image retrieving;

receiving a retrieving result from the server, wherein if the image retrieving succeeds, then the retrieving result comprises position data $(x^0, y^0)$, an actual size $S_r$, and virtual information of a target object which is successfully searched;

using $(x^0, y^0)$ as an initial position for tracking the target object in camera frame stream; and recording a position $(x^t, y^t)$ and a pixel size $S_p^t$ of the target object in a current image if the target object is successfully tracked;

according to $f_{c \to s}$, mapping the position $(x^t, y^t)$ to a screen coordinate system for obtaining a left/right image display position on a screen;

according $S_r$ and $S_p^t$, calculating a distance $D^t$ between the target object and a camera referring to an imaging scale of the camera;

assigning $D^t$ to $L_n$, and calculating the left-right image equivalent-center spacing $d^t$ according to $f_{d \to i}$;

according to the left/right image display position on the screen and the left-right image equivalent-center spacing $d^t$, calculating a right/left image display position on the screen; and respectively displaying the virtual information of the target object at the left and the right image display positions on the screen, or respectively displaying the virtual information of the target object with a calculated position of either left or right image and a certain shift between them.

Preferably, the camera image is processed with distortion correction according to intrinsic parameters of the camera, and subsequent operations are provided based on an undistorted image.

Preferably, when the image retrieving succeeds, the current image is processed with distortion correction according to intrinsic parameters of the camera; and the position $(x^t, y^t)$ and the pixel size $S_p^t$ of the target object in a corrected current image are recorded.

Preferably, the camera imaged is processed with grayscale processing, and a processed image is uploaded to the server for image retrieving.

Preferably, if the retrieving result indicates searching failure, the current image of the camera is uploaded to the server once every 1-7 seconds for image retrieving.

Preferably, the mapping relationship $f_{d \to i}$ between the left-right image equivalent-center spacing $d^t$ and the virtual image-eye distance $L_n$ satisfies:

$$L_n = \frac{D_0[FL - L_1(L-F)]}{(d_0 - D_0)(L-F) - F(d^t - d_0)}$$

wherein $D_0$ is a user pupil distance, $L_1$ is an equivalent distance between eyes and a lens set of an optical system, L is a distance between an image display source and the lens set of the optical system, F is a focal length of the lens set of the optical system, $d_0$ is an equivalent optical axis spacing between two optical systems of the binocular see-through AR head-mounted display device.

Preferably, the distance $D^t$ between the target object and the camera is calculated referring to $$D^t = \frac{S_p^t}{S_r} \Box v,$$

wherein v is a pre-set image distance.

Secondly, the present invention provides a binocular see-through AR head-mounted display device, comprising: an optical module, an image displayer, an image acquisition module, a data communication module, a tracking module and a data processing module; wherein a camera-screen mapping relationship $f_{c \to s}$, and a mapping relationship $f_{d \to i}$ between a left-right image equivalent-center spacing $d^t$ and a virtual image-eye distance $L_n$ are pre-stored in the data processing module;

wherein the optical module comprises an optical lens; a user synchronically sees an external environment and virtual information on the image displayer through the optical module;

wherein the image acquisition module obtains a camera image;

wherein the data communication module is adopted for uploading the camera image to a server for image retrieving and receiving a retrieving result from the server, wherein if the image retrieving succeeds, then the retrieving result comprises position data $(x^0, y^0)$, an actual size $S_r$, and virtual information of a target object which is successfully searched;

wherein the tracking module is adopted for using $(x^0, y^0)$ as an initial position for tracking the target object in a camera real-time image; and recording a position $(x^t, y^t)$ and a pixel size $S_p^t$ of the target object in a current image if the target object is successfully tracked;

wherein the data processing module is adopted for according to $f_{c \to s}$, mapping the position $(x^t, y^t)$ to a screen coordinate system for obtaining a left/right image display position on a screen; according $S_r$ and $S_p^t$, calculating a distance $D^t$ between the target object and a camera referring to an imaging scale of the camera; assigning $D^t$ to $L_n$, and calculating the left-right image equivalent-center spacing $d^t$ according to $f_{d \to i}$; and according to the left/right image display position on the screen and the left-right image equivalent-center spacing $d^t$, calculating a right/left image display position on the screen;

wherein the image displayer is adopted for respectively displaying the virtual information of the target object at the left and the right image display positions on the screen, or respectively displaying the virtual information of the target object with a calculated position of either left or right image and a certain shift between them.

Preferably, the image displayer comprises two micro screens, or the image displayer is a screen divided into a left displaying area and a right displaying area.

Preferably, the binocular see-through AR head-mounted display device further comprises a distortion correction module for processing the camera image with distortion correction according to intrinsic parameters of the camera.

Preferably, the tracking module is adopted for using $(x^0, y^0)$ as an initial position for tracking the target object in a camera real-time image, wherein when the image retrieving succeeds, the current image is processed with distortion correction according to intrinsic parameters of the camera; and the position $(x^t, y^t)$ and the pixel size $S_p^t$ of the target object in a corrected current image are recorded.

Preferably, the image acquisition module also processes the camera imaged with grayscale processing; the data communication module uploads a processed image is uploaded to the server for image retrieving, and receives the retrieving result.

Preferably, the mapping relationship $f_{d \to i}$ between the left-right image equivalent-center spacing $d^t$ and the virtual image-eye distance $L_n$ satisfies:

$$L_n = \frac{D_0[FL - L_1(L-F)]}{(d_0 - D_0)(L-F) - F(d^t - d_0)}$$

wherein $D_0$ is a user pupil distance, $L_1$ is an equivalent distance between eyes and a lens set of an optical system, L is a distance between an image display source and the lens set of the optical system, F is a focal length of the lens set of the optical system, $d_0$ is an equivalent optical axis spacing between two optical systems of the binocular see-through AR head-mounted display device.

Preferably, the distance $D^t$ between the target object and the camera is calculated referring to $$D^t = \frac{S_p^t}{S_r} \square v$$

by the date processing module, wherein v is a pre-set image distance.

Thirdly, the present invention provided an augmented reality information display system, comprising a head-mounted display device and a server, wherein:

a sample image, an actual size $S_r$, and virtual information of a target object is stored on the server;

after receiving an image retrieving requirement form the head-mounted display device, the server executes image retrieving and returns a retrieving result to the head-mounted display device, wherein if the image retrieving succeeds, then the retrieving result comprises position data $(x^0, y^0)$, the actual size $S_r$, and the virtual information of the target object which is successfully searched;

the head-mounted display device is a binocular see-through AR head-mounted display device.

The present invention is simple. Based on that the mapping relationships $f_{c \to s}$ and $f_{d \to i}$ are pre-stored in the head-mounted device, the position of the target object in the camera image is obtained through an image tracking method, and is mapped to the screen coordinate system of the head-mounted device for calculating the left/right image display position. Through a monocular distance finding method, the distance between the target object and the camera is real-time calculated referring to the imaging scale of the camera, so as to calculate a left-right image distance, thereby calculating the right or the right image display position. The present invention is highly reliable with low cost. The conventional depth of field adjustment is to change an image distance of an optical element. However, the present invention breaks conventional thinking, which calculates the left and the right image display positions for depth of field adjustment without changing a structure of an optical device. The present invention is novel and practical compared to changing an optical focal length.

BRIEF DESCRIPTION OF THE DRAWINGS

In order to more clearly illustrate the embodiments of the present invention or the technical solutions in the prior art, the following drawings, which are to be used in the description of the embodiments or the prior art, will be briefly described. It will be apparent that the drawings in the following description are some embodiments of the present invention, and for the benefit of one of ordinary skill in the art, other drawings may be obtained from these drawings without departing from the inventive labor.

DETAILED DESCRIPTION OF THE PREFERRED EMBODIMENT

Figure 1:
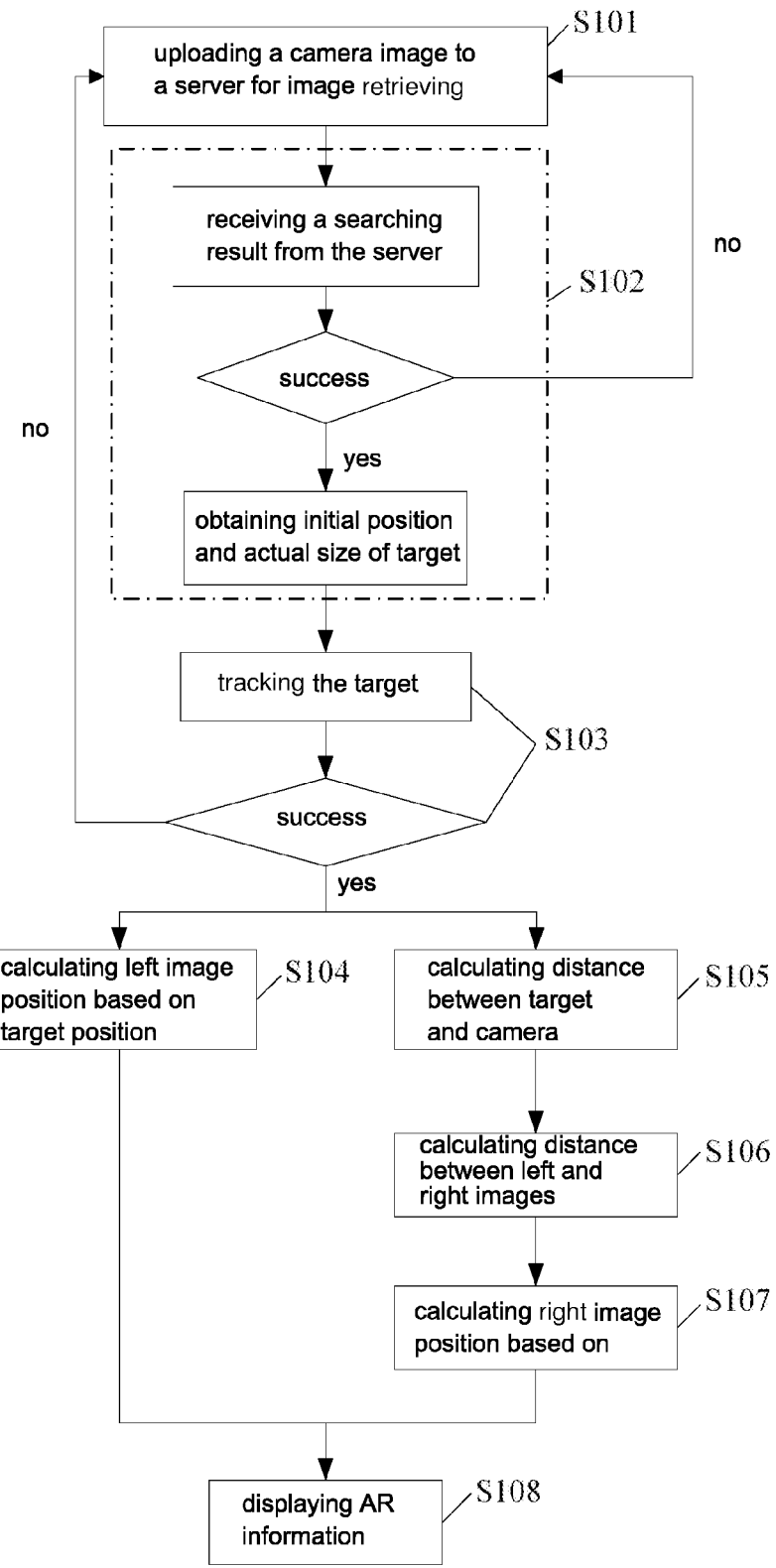
FIG. 1 is a flow chart of an information display method for a binocular see-through AR head-mounted display device according to a preferred embodiment of the present invention.

The embodiments of the present invention will now be described in conjunction with the accompanying drawings in the embodiments of the present invention, and it will be apparent that the described embodiments are merely part of the embodiments of the invention and are not intended to be exhaustive. All other embodiments obtained by those of ordinary skill in the art without making creative work are within the scope of the present invention, based on embodiments of the invention.

First of all, terms referred to in the embodiment of the present invention will be explained in detail.

AR: Augmented Reality.

Camera-screen mapping relationship: Obtained by offline calibration. A calibration method comprises mapping a coordinate of a target object in a camera image onto a screen of an optical module, in such a manner that a coordinate area mapped to the screen coincides with a target position seen by a user through a lens. According to the present invention, the mapping relationship is called the camera-screen mapping relationship, and marked as $f_{c \to s}$.

Mapping relationship $f_{d \to i}$ between a left-right image equivalent-center spacing $d^t$ and a virtual image-eye distance $L_n$: the user of a binocular head-mounted device observes a left virtual image and a right virtual image by left and right eyes respectively. When a left eye sight line observing the left virtual image intersects with a right eye sight line observing the right virtual image, the eyes will see an overlapping virtual picture with a certain distance from the user. The virtual image-eye distance $L_n$ is determined by spatial sight vectors respected formed by the left virtual image with the left eye, and the right virtual image with the right eye. The left and right spatial sight vectors are determined by the target observed. Therefore, in the binocular head-mounted device, the left and right spatial sight vectors of the user are determined by center point coordinates of a left group and a right group of effective displayed images. So there is a correspondence between the virtual image projecting distance $L_n$ in the binocular head-mounted device and the left-right image equivalent-center spacing $d^t$ of a head-mounted device image source. According to the embodiment of the present invention, the mapping relationship is called the mapping relationship between the left-right image equivalent-center spacing $d^t$ and the virtual image-eye distance $L_n$, marked as $f_{d \to i}$.

Since being mentioned, the left-right image equivalent-center spacing is defined as follows.

Equivalent optical axis: when a visual optical system with the human eye as an exit pupil uses a reverse optical path designed system, an axis which passes through an exit pupil center and perpendicular to an exit pupil plane is the equivalent optical axis.

Equivalent image source displayer: in a visual optical system with the human eye as the exit pupil, a light beam passing through the optical axis can be reverse traced, which passes through the exit pupil center and perpendicular to the exit pupil plane. When the light beam intersects with an optical surface for a first time, a plane tangent to the optical surface is made at an intersection point, and non-traced optical surface after the optical surface is mirror-expanded according to the plane (i.e., the plane is used as a mirror, so as to obtain symmetry of the non-traced optical surface after the optical surface). In an expanded optical system, tracing the light beam is continued in a system of non-traced optical surfaces. When the light beam intersects with the optical surface for a second time, a plane tangent to the optical surface is made at an intersection point, and non-traced optical surface after the optical surface is mirror-expanded according to the plane, repeating until a last surface. Thus, an expanded symmetric image of the image source displayer can be obtained, and the embodiment of the present invention defines the symmetric image as the equivalent image source displayer.

Figure 4:
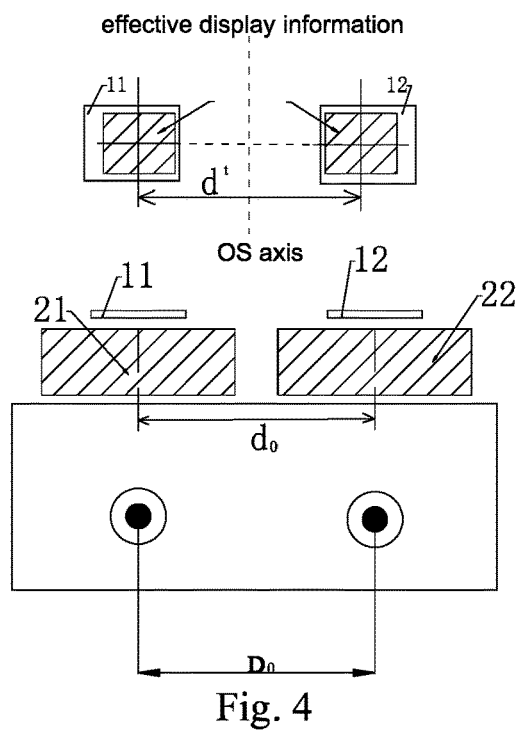
FIG. 4 is a sketch view of a left-right image equivalent-center spacing $d^t$ according to FIG. 3.

A center spacing between effective display information on a left group and a right group of the equivalent image source displayers is defined as the left-right image equivalent-center spacing $d^t$. For persons skilled in the art, it can be understood that left and right display information on a screen needs to be overlapped, which means that a line connecting center points of the display information on the left group and the right group of the equivalent image displayers must be perpendicular to an OS axis (as shown in FIG. 4). Therefore, the left-right image equivalent-center spacing $d^t$ of the present invention is under a condition that the line connecting the left and right center points is perpendicular to the OS axis.

Figure 3:
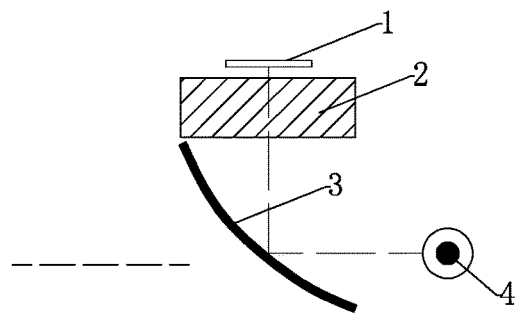
FIG. 3 is a sketch view of a first optical module arrangement of a head-mounted display device.
Figure 5:
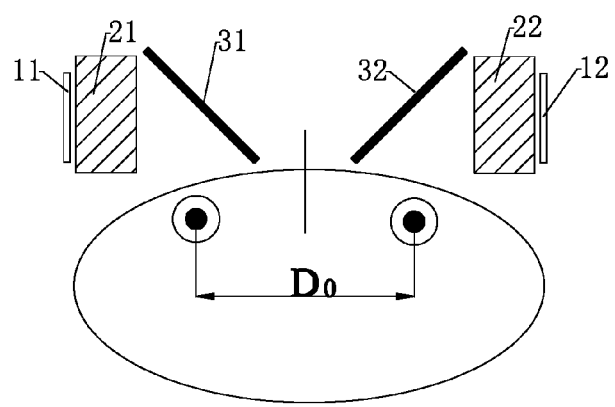
FIG. 5 is a sketch view of a second optical module arrangement of the head-mounted display device.
Figure 6:
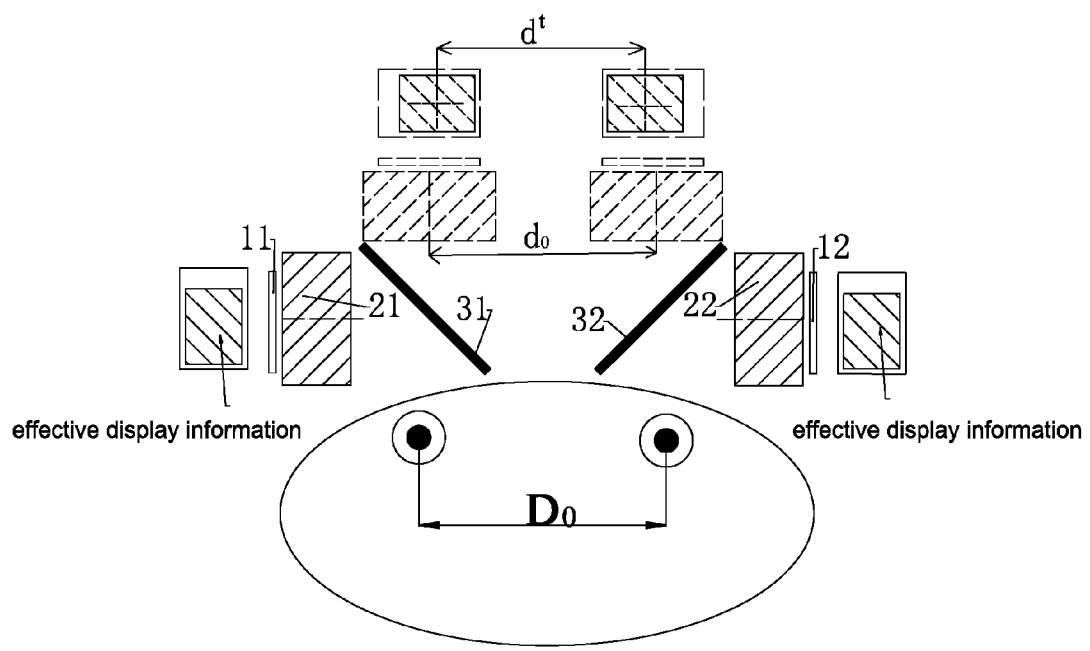
FIG. 6 is a sketch view of the left-right image equivalent-center spacing $d^t$ according to FIG. 5.

Referring to FIGS. 3-6, when the optical module of the head-mounted display device adopts an arrangement as shown in FIG. 3 (i.e. the image display source 1 is above the human eyes, light beams from the image display source 1 pass through an amplifier 2 before being reflected into the human eyes 4 by a semi-reflective lens 3), then an equivalent center spacing of an amplifying system $d_0$ (i.e. an equivalent optical axis spacing between two optical systems of the head-mounted device) and the left-right image equivalent-center spacing $d^t$ are shown in FIG. 4. Referring to FIGS. 4, 11 and 12 are left and right image display sources; 21 and 22 are left and right amplifying systems; and $D_0$ is a user pupil distance. When the optical module of the head-mounted display device adopts an arrangement as shown in FIG. 5 (i.e. the image display sources 11 and 12 are arranged at two side of the human eyes), then the equivalent center spacing of the amplifying system $d_0$ (i.e. the equivalent optical axis spacing between two optical systems of the head-mounted device) and the left-right image equivalent-center spacing $d^t$ are shown in FIG. 6. Referring to FIGS. 6, 11 and 12 are left and right image display sources; 21 and 22 are left and right amplifying systems; $D_0$ is a user pupil distance; and 31 and 32 are left and right semi-reflective lenses.

Figure 2:
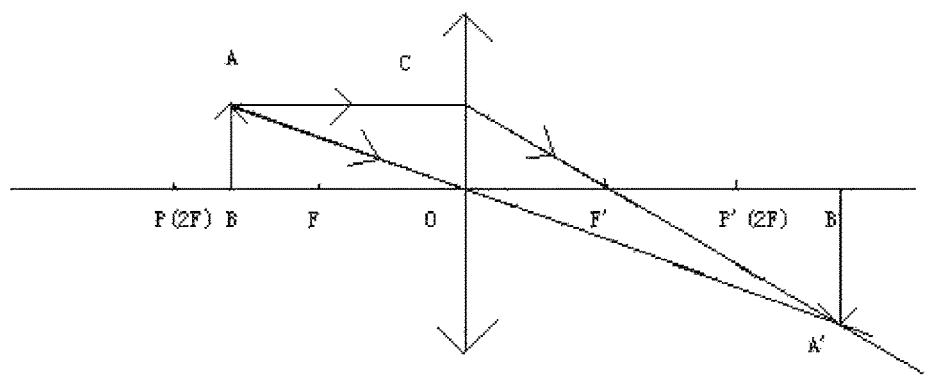
FIG. 2 is a sketch view of camera imaging.

A camera-screen mapping relationship $f_{c \to s}$, and a mapping relationship $f_{d \to i}$ between a left-right image equivalent-center spacing $d^t$ and a virtual image-eye distance $L_n$ are pre-stored in the binocular see-through AR head-mounted display device. Referring to FIG. 1, a flow chart of an information display method for a binocular see-through AR head-mounted display device according to the present invention is illustrated, comprising steps S101-S108 of:

S101: uploading a camera image to a server for image retrieving; wherein preferably, for cost saving, the camera image is converted into a grayscale image before uploading the grayscale image to the server for image retrieving, so as to find out a target object in the grayscale image;

S102: receiving a retrieving result from the server, wherein if the image retrieving succeeds, then the retrieving result comprises position data $(x^o, y^o)$, an actual size $S_r$, and virtual information of a target object which is successfully searched, and S103 is executed; if the image retrieving fails, S101 is repeated, wherein for lowering a pressure of the server, the camera image is uploaded to the server again once every 1-7 seconds for image retrieving (a too-long interval will increase a user waiting time, affecting experience);

S103: using $(x^o, y^o)$ as an initial position for tracking the target object in a camera real-time image; and recording a position $(x^t, y^t)$ and a pixel size $S_p^t$ of the target object in a current image if the target object is successfully tracked; or repeating S101-S102 if the target object is unsuccessfully tracked;

S104: according to $f_{c \to s}$, mapping the position $(x^t, y^t)$ to a screen coordinate system for obtaining a left image display position $(x_l^t, y_l^t)$ on a screen; wherein $(x_l^t, y_l^t) = f_{c \to s}((x^t, y^t))$, t represents time;

S105: according $S_r$ and $S_p^t$, calculating a distance $D^t$ between the target object and a camera referring to an imaging scale of the camera; wherein referring to FIG. 2, a sketch view of camera imaging, AB is an object, A'B' is an image, an object OB is marked as u, an image distance OB' is marked as v, an object length AB=x, and an image length A'B'=y, then it can be concluded from a triangle similarity relation that $$\frac{x}{u} = \frac{y}{v},$$

modified as $$u = \frac{y}{x} \Box v;$$

when a focal distance of the camera is constant, the object distance can be obtained according to the above equation; in the preferred embodiment, the distance $D^t$ between the target object and the camera is the object distance, the actual size $S_r$ of the target object is the object length, and the pixel size $S_p^t$ of the target object is the image length; the image distance v is determined by an internal optical structure of the camera, when a camera optical structure is determined, the image distance v is constant; during measuring, a group of x and y data is measured for fitting of a polynomial; therefore, the distance $D^t$ between the target object and the camera is calculated with $$D^t = \frac{S_p^t}{S_r} \Box v;$$

the equation involves errors (which can by decreased by distortion correction) because the camera image has radial distortion and tangential distortion, especially at image edges; therefore, measuring results will be more accurate if a large amount of data is detected and fitted for obtaining a polynomial with in order 1 or higher order;

S106: assigning $D^t$ to $L_n$, and calculating the left-right image equivalent-center spacing $d^t$ according to $f_{d \to i}$, then $d^t = f_{d \to i}(D^t)$;

S107: according to the left image display position $(x_l^t, y_l^t)$ on the screen and the left-right image equivalent-center spacing $d^t$, calculating a right image display position $(x_r^t, y_r^t)$ on the screen; wherein the right image display position $(x_r^t, y_r^t)$ on the screen is calculated with $(x_r^t, y_r^t) = (x_l^t + d^t, y_l^t)$; and S108: displaying AR information, specifically, respectively displaying the virtual information of the target object at the left and the right image display positions on the screen, or respectively displaying the virtual information of the target object with a calculated position of either left or right image and a certain shift between them; wherein when respectively displaying the virtual information of the target object at the left and the right image display positions on the screen, the user can see the virtual information at a target object position through the head-mounted device; when respectively displaying the virtual information of the target object at the shifted positions based on the left and the right image display positions on the screen with the certain shift, the user can see the virtual information beside the target object position through the head-mounted device; with the certain shift, the virtual information can be displayed beside the target object, so as to avoid blocking the target object, which is more consistent with user habits; during shifting, information source images of the left and right virtual information must be synchronically shifted, which means a center spacing and a relative position of the left and right information source images remain, and only positions thereof on the image display source are moved.

In the preferred embodiment, if the camera-screen mapping relationship $f_{c \to s}$ is a relationship between the camera and a left screen, then the left image position is firstly obtained in S104, then the right image position is calculated in S107. If the camera-screen mapping relationship $f_{c \to s}$ is a relationship between the camera and a right screen, then the right image position is firstly obtained in S104, then the left image position is calculated in S107. In claims, using "/" represent "or".

In the preferred embodiment, the mapping relationship $f_{d \to i}$ between the left-right image equivalent-center spacing $d^t$ and the virtual image-eye distance $L_n$ satisfies:

$$L_n = \frac{D_0[FL - L_1(L - F)]}{(d_0 - D_0)(L - F) - F(d^t - d_0)} \quad (1)$$

wherein $D_0$ is a user pupil distance, $L_1$ is an equivalent distance between eyes and a lens set of an optical system, L is a distance between an image display source and the lens set of the optical system, F is a focal length of the lens set of the optical system, $d_0$ is an equivalent optical axis spacing between two optical systems of the binocular see-through AR head-mounted display device. When the structure of the head-mounted display device is determined, the user pupil distance $D_0$, the equivalent distance $L_1$ between the eyes and the lens set of the optical system, the distance L between the image display source and the lens set of the optical system, the is equivalent optical axis spacing $d_0$ between two optical systems, and the focal length F of the lens set of the optical system are usually constant, then the virtual image-eye distance 1, is only related to the equivalent spacing between the left and right groups of effect display information (the left-right image equivalent-center spacing) $d^t$.

A calculation method as shown in FIG. 1 involves errors (a biggest error occurs when calculating the pixel size in S103) because the camera image has radial distortion and tangential distortion, especially at image edges. Therefore, in S101, the camera image is processed with distortion correction according to intrinsic parameters of the camera, and subsequent operations are provided based on an undistorted image. However, such processing costs a lot since every camera image is processed with distortion correction. Alternatively, when the image retrieving succeeds, the current image is processed with distortion correction according to intrinsic parameters of the camera; and the position $(x^t, y^t)$ and the pixel size $S_p^t$ of the target object in a corrected current image are recorded.

The preferred embodiment of the present invention also provided a binocular see-through AR head-mounted display device corresponding to the above information display method, comprising: an optical module, an image displayer, an image acquisition module, a data communication module, a tracking module and a data processing module; wherein a camera-screen mapping relationship $f_{c \to s}$, and a mapping relationship $f_{d \to i}$ between a left-right image equivalent-center spacing $d^t$ and a virtual image-eye distance $L_n$ are pre-stored in the data processing module; the mapping relationship $f_{d \to i}$ can also be the equation (1).

wherein the optical module comprises an optical lens; a user synchronically sees an external environment and virtual information on the image displayer through the optical module;

wherein the image acquisition module obtains a camera image and coverts the camera image into a grayscale image;

wherein the data communication module is adopted for uploading the grayscale camera image to a server for image retrieving and receiving a retrieving result from the server, wherein the retrieving result may be success or failure, and the data communication module receives the retrieving result no matter success or failure; if the image retrieving succeeds, then the retrieving result comprises position data $(x^0, y^0)$, an actual size $S_r$, and virtual information of a target object which is successfully searched;

wherein the tracking module is adopted for using $(x^0, y^0)$ as an initial position for tracking the target object in a camera real-time image; and recording a position $(x^t, y^t)$ and a pixel size $S_p^t$ of the target object in a current image if the target object is successfully tracked;

wherein the data processing module is adopted for according to $f_{c \to s}$, mapping the position $(x^t, y^t)$ to a screen coordinate system for obtaining a left/right image display position on a screen;

wherein the data processing module is adopted for according $S_r$ and $S_p^t$, calculating a distance $D^t$ between the target object and a camera referring to an imaging scale of the camera; assigning $D^t$ to $L_n$, and calculating the left-right image equivalent-center spacing $d^t$ according to $f_{d \to i}$; and according to the left/right image display position on the screen and the left-right image equivalent-center spacing $d^t$, calculating a right/left image display position on the screen;

wherein the image displayer is adopted for respectively displaying the virtual information of the target object at the left and the right image display positions, or respectively displaying the virtual information of the target object with a calculated position of either left or right image and a certain shift between them.

The image displayer comprises two micro screens, or the image displayer is a screen divided into a left displaying area and a right displaying area.

Preferably, the binocular see-through AR head-mounted display device further comprises a distortion correction module for processing the camera image with distortion correction according to intrinsic parameters of the camera. There are two distortion correction modes: 1) every camera image is processed with distortion correction, and subsequent operations are provided based on an undistorted image; 2), when the image retrieving succeeds, the current image is processed with distortion correction according to intrinsic parameters of the camera; and the position $(x^t, y^t)$ and the pixel size $S_p^t$ of the target object in a corrected current image are recorded.

Accordingly, the preferred embodiment of the present invention also provides an augmented reality information display system, comprising a head-mounted display device and a server, wherein the head-mounted display device is the above binocular see-through AR head-mounted display device. A sample image, an actual size $S_r$, and virtual information of a target object is stored on the server. After receiving an image retrieving requirement form the head-mounted display device, the server executes image retrieving and returns a retrieving result to the head-mounted display device, wherein the retrieving result may be success or failure, and the data communication module receives the retrieving result no matter success or failure; if the image retrieving succeeds, then the retrieving result comprises position data $(x^0, y^0)$, the actual size $S_r$, and the virtual information of the target object which is successfully searched.

According to the preferred embodiment of the present invention, the mapping relationship $f_{d \to i}$ is derived to the equation (1) through theories of optics and space geometry. Also, the mapping relationship can be obtained by offline calibration, and a calibration method comprises displaying calibration patterns on a left and a right of the image display source, and recording eye ball sight vectors by an eye tracking system when the user watches overlapping calibration charts projected in front of the human eyes, and recording a relationship between the eye ball sight vectors and coordinates of the calibration patterns. $L_n$ can be calculated according to the coordinates of the calibration patterns, and $D^t$ can be calculated according to the eye ball sight vectors. Multiple tests are carried with multiple testers for obtaining multiple groups of data, and the multiple groups of data are fitted for obtaining a relatively accurate mapping relationship.

The present invention adopts a theory that "when the virtual image-eye distance $L_n$ equals to the perpendicular distance $D^t$ between the target object and the user, a virtual image and the target object have a same spatial position", so as to precisely overlap the virtual information at position near the target object, in such a manner that the virtual information is highly integrated with an environment, achieving a true sense of virtual reality. The present invention is simple. Based on that the mapping relationships $f_{c \to s}$ and $f_{d \to i}$ are pre-stored in the head-mounted device, the position of the target object in the camera image is obtained through an image tracking method, and is mapped to the screen coordinate system of the head-mounted device for calculating the left/right image display position. Through a monocular distance finding method, the distance between the target object and the camera is real-time calculated referring to the imaging scale of the camera, so as to calculate a left-right image distance, thereby calculating the right or the right image display position. The present invention is highly reliable with low cost. The conventional depth of field adjustment is to change an image distance of an optical element. However, the present invention breaks conventional thinking, which calculates the left and the right image display positions for depth of field adjustment without changing a structure of an optical device. The present invention is novel and practical compared to changing an optical focal length.

All of the features disclosed in this specification, or all of the methods or processes disclosed therein, may be combined in any manner other than mutually exclusive features and/or steps.

Any feature disclosed in this specification (including any additional claims, abstracts and drawings), unless specifically stated, may be replaced by other equivalents with equivalent or similar purposes. That is, unless specifically described, each feature is only an example of a series of equivalent or similar features.

The present invention is not limited to the specific embodiments described above. The present invention extends to any new feature or any new combination disclosed in this specification, as well as any new method or process of disclosure or any new combination disclosed.

What is claimed is:

1. A binocular see-through AR (augmented reality) head-mounted display device, comprising: an optical module, an image displayer, an image acquisition module, a data communication module, a tracking module and a data processing module; wherein a camera-screen mapping relationship $f_{c \to s}$, and a mapping relationship $f_{d \to i}$ between a left-right image equivalent-center spacing $d^t$ and a virtual image-eye distance $L_n$ are pre-stored in the data processing module;
   wherein the optical module comprises an optical lens; a user synchronically sees an external environment and virtual information on the image displayer through the optical module;
   wherein the image acquisition module obtains a camera image;
   wherein the data communication module is adopted for uploading the camera image to a server for image retrieving and receiving a retrieving result from the server, wherein if the image retrieving succeeds, then the retrieving result comprises position data $(x^0, y^0)$, an actual size $S_r$, and virtual information of a target object which is successfully searched;
   wherein the tracking module is adopted for using $(x^0, y^0)$ as an initial position for tracking the target object in a camera real-time image; and recording a position $(x^t, y^t)$ and a pixel size $S_p^t$ of the target object in a current image if the target object is successfully tracked;
   wherein the data processing module is adopted for according to $f_{c \to s}$, mapping the position $(x^t, y^t)$ to a screen coordinate system for obtaining a left/right image display position on a screen; according $S_r$ and $S_p^t$, calculating a distance $D^t$ between the target object and a camera referring to an imaging scale of the camera; assigning $D^t$ to $L_n$, and calculating the left-right image equivalent-center spacing $d^t$ according to $f_{d \to i}$; and according to the left/right image display position on the screen and the left-right image equivalent-center spacing $d^t$, calculating a right/left image display position on the screen;
   wherein the image displayer is adopted for respectively displaying the virtual information of the target object at the left and the right image display positions on the screen, or respectively displaying the virtual information of the target object at shifted positions based on the left and the right image display positions on the screen with a certain shift.

2. The binocular see-through AR head-mounted display device, as recited in claim 1, wherein the image displayer comprises two micro screens, or the image displayer is a screen divided into a left displaying area and a right displaying area.

3. The binocular see-through AR head-mounted display device, as recited in claim 1, further comprising a distortion correction module for processing the camera image with distortion correction according to internal parameters of the camera.

4. The binocular see-through AR head-mounted display device, as recited in claim 1, wherein the tracking module is adopted for using $(x^0, y^0)$ as an initial position for tracking the target object in a camera real-time image, wherein when the image retrieving succeeds, the current image is processed with distortion correction according to internal parameters of the camera; and the position $(x^t, y^t)$ and the pixel size $S_p^t$ of the target object in a corrected current image are recorded.

5. The binocular see-through AR head-mounted display device, as recited in claim 1, wherein the image acquisition module also processes the camera imaged with grayscale processing; the data communication module uploads a processed image is uploaded to the server for image retrieving, and receives the retrieving result.

6. The binocular see-through AR head-mounted display device, as recited in claim 1, wherein the mapping relationship $f_{d \to i}$ between the left-right image equivalent-center spacing $d^t$ and the virtual image-eye distance $L_n$ satisfies:

$$L_n = \frac{D_0[FL - L_1(L - F)]}{(d_0 - D_0)(L - F) - F(d^t - d_0)}$$

wherein $D_0$ is a user pupil distance, $L_1$ is an equivalent distance between eyes and a lens set of an optical system, L is a distance between an image display source and the lens set of the optical system, F is a focal length of the lens set of the optical system, $d_0$ is an equivalent optical axis spacing between two optical systems of the binocular see-through AR head-mounted display device.

7. The binocular see-through AR head-mounted display device, as recited in claim 4, wherein the mapping relationship $f_{d \to i}$ between the left-right image equivalent-center spacing $d^t$ and the virtual image-eye distance $L_n$ satisfies:

$$L_n = \frac{D_0[FL - L_1(L - F)]}{(d_0 - D_0)(L - F) - F(d^t - d_0)}$$

wherein $D_0$ is a user pupil distance, $L_1$ is an equivalent distance between eyes and a lens set of an optical system, L is a distance between an image display source and the lens set of the optical system, F is a focal length of the lens set of the optical system, $d_0$ is an equivalent optical axis spacing between two optical systems of the binocular see-through AR head-mounted display device.

8. The binocular see-through AR head-mounted display device, as recited in claim 5, wherein the mapping relationship $f_{d \to i}$ between the left-right image equivalent-center spacing $d^t$ and the virtual image-eye distance $L_n$ satisfies:

$$L_n = \frac{D_0[FL - L_1(L-F)]}{(d_0 - D_0)(L-F) - F(d^t - d_0)}$$

wherein $D_0$ is a user pupil distance, $L_1$ is an equivalent distance between eyes and a lens set of an optical system, L is a distance between an image display source and the lens set of the optical system, F is a focal length of the lens set of the optical system, $d_0$ is an equivalent optical axis spacing between two optical systems of the binocular see-through AR head-mounted display device.

9. The binocular see-through AR head-mounted display device, as recited in claim 1, wherein the distance $D^t$ between the target object and the camera is calculated referring to $$D^t = \frac{S_p^t}{S_r} \Box v$$

by the date processing module, wherein v is a pre-set image distance.

10. The binocular see-through AR head-mounted display device, as recited in claim 4, wherein the distance $D^t$ between the target object and the camera is calculated referring to $$D^t = \frac{S_p^t}{S_r} \Box v$$

by the date processing module, wherein v is a pre-set image distance.

11. An augmented reality information display system, comprising a head-mounted display device and a server, wherein:
  a sample image, an actual size $S_r$, and virtual information of a target object is stored on the server;
  after receiving an image retrieving requirement form the head-mounted display device, the server executes image retrieving and returns a retrieving result to the head-mounted display device, wherein if the image retrieving succeeds, then the retrieving result comprises position data $(x^0, y^0)$, the actual size $S_r$, and the virtual information of the target object which is successfully searched;
  the head-mounted display device is a binocular see-through AR head-mounted display device, as recited in claim 1.

12. An information display method for a binocular see-through AR (augmented reality) head-mounted display device, wherein a camera-screen mapping relationship $f_{c \to s}$, and a mapping relationship $f_{d \to i}$ between a left-right image equivalent-center spacing $d^t$ and a virtual image-eye distance $L_n$ are pre-stored in the binocular see-through AR head-mounted display device; wherein the information display method comprises steps of:
  uploading a camera image to a server for image retrieving;
  receiving a retrieving result from the server, wherein if the image retrieving succeeds, then the retrieving result comprises position data $(x^0, y^0)$, an actual size $S_r$, and virtual information of a target object which is successfully searched;
  using $(x^0, y^0)$ as an initial position for tracking the target object in a camera real-time image; and recording a position $(x^t, y^t)$ and a pixel size $S_p^t$ of the target object in a current image if the target object is successfully tracked;
  according to $f_{c \to s}$, mapping the position $(x^t, y^t)$ to a screen coordinate system for obtaining a left/right image display position on a screen;
  according $S_r$ and $S_p^t$, calculating a distance $D^t$ between the target object and a camera referring to an imaging scale of the camera;
  assigning $D^t$ to $L_n$, and calculating the left-right image equivalent-center spacing $d^t$ according to $f_{d \to i}$;
  according to the left/right image display position on the screen and the left-right image equivalent-center spacing $d^t$, calculating a right/left image display position on the screen; and
  respectively displaying the virtual information of the target object at the left and the right image display positions on the screen, or respectively displaying the virtual information of the target object with a calculated position of either left or right image and a certain shift between them.

13. The information display method, as recited in claim 12, wherein the camera image is processed with distortion correction according to intrinsic parameters of the camera, and subsequent operations are provided based on an undistorted image.

14. The information display method, as recited in claim 12, wherein when the image retrieving succeeds, the current image is processed with distortion correction according to intrinsic parameters of the camera; and the position $(x^t, y^t)$ and the pixel size $S_p^t$ of the target object in a corrected current image are recorded.

15. The information display method, as recited in claim 12, wherein the camera imaged is processed with grayscale processing, and a processed image is uploaded to the server for image retrieving.

16. The information display method, as recited in claim 12, wherein if the retrieving result indicates searching failure, the current image of the camera is uploaded to the server once every 1-7 seconds for image retrieving.

17. The information display method, as recited in claim 12, wherein the mapping relationship $f_{d \to i}$ between the left-right image equivalent-center spacing $d^t$ and the virtual image-eye distance $L_n$ satisfies:

$$L_n = \frac{D_0[FL - L_1(L-F)]}{(d_0 - D_0)(L-F) - F(d^t - d_0)}$$

wherein $D_0$ is a user pupil distance, $L_1$ is an equivalent distance between eyes and a lens set of an optical system, L is a distance between an image display source and the lens set of the optical system, F is a focal length of the lens set of the optical system, $d_0$ is an equivalent optical axis spacing between two optical systems of the binocular see-through AR head-mounted display device.

18. The information display method, as recited in claim 14, wherein the mapping relationship $f_{d \to i}$ between the left-right image equivalent-center spacing $d^t$ and the virtual image-eye distance $L_n$ satisfies:

$$L_n = \frac{D_0[FL - L_1(L-F)]}{(d_0 - D_0)(L-F) - F(d^t - d_0)}$$

wherein $D_0$ is a user pupil distance, $L_1$ is an equivalent distance between eyes and a lens set of an optical system, L is a distance between an image display source and the lens set of the optical system, F is a focal length of the lens set of the optical system, $d_0$ is an equivalent optical axis spacing between two optical systems of the binocular see-through AR head-mounted display device.

19. The information display method, as recited in claim 16, wherein the mapping relationship $f_{d \to i}$ between the left-right image equivalent-center spacing $d^t$ and the virtual image-eye distance $L_n$ satisfies:

$$L_n = \frac{D_0[FL - L_1(L-F)]}{(d_0 - D_0)(L-F) - F(d^t - d_0)}$$

wherein $D_0$ is a user pupil distance, $L_1$ is an equivalent distance between eyes and a lens set of an optical system, L is a distance between an image display source and the lens set of the optical system, F is a focal length of the lens set of the optical system, $d_0$ is an equivalent optical axis spacing between two optical systems of the binocular see-through AR head-mounted display device.

20. The information display method, as recited in claim 1, wherein the distance $D^t$ between the target object and the camera is calculated referring to $$D^t = \frac{S_p^t}{S_r} \Box v,$$

wherein v is a pre-set image distance.

* * * * *